(12) United States Patent
Ishizuka et al.

(10) Patent No.: US 10,911,264 B2
(45) Date of Patent: Feb. 2, 2021

(54) IN-VEHICLE NETWORK SYSTEM, RELAY DEVICE, AND METHOD OF CONTROLLING IN-VEHICLE NETWORK SYSTEM

(71) Applicant: TOYOTA JIDOSHA KABUSHIKI KAISHA, Toyota (JP)

(72) Inventors: Shu Ishizuka, Toyota (JP); Yoshiro Hirata, Toyota (JP); Hiroya Ando, Toyota (JP); Taichi Matsumura, Toyota (JP); Masashi Amesara, Toyota (JP); Yutaka Ueda, Yokkaichi (JP); Toshio Kawamura, Nagakute (JP); Tomomi Kawamura, Nagakute (JP); Yoshifumi Ohmori, Nagoya (JP); Toshio Shimada, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/845,637

(22) Filed: Dec. 18, 2017

(65) Prior Publication Data
US 2018/0183626 A1    Jun. 28, 2018

(30) Foreign Application Priority Data
Dec. 22, 2016   (JP) ................. 2016-250000

(51) Int. Cl.
*H04L 12/66*    (2006.01)
*H04L 12/46*    (2006.01)
(Continued)

(52) U.S. Cl.
CPC .............. *H04L 12/66* (2013.01); *H04L 12/46* (2013.01); *H04L 12/4625* (2013.01);
(Continued)

(58) Field of Classification Search
CPC ......... G06F 21/85; H04L 12/44; H04L 12/46; H04L 12/66; H04L 12/4625; H04L 12/4641; H04L 12/40013; H04L 12/40039; H04L 9/0869; H04L 41/00; H04L 2209/84; H04L 2012/40273; H04L 67/12;
(Continued)

(56) References Cited

U.S. PATENT DOCUMENTS

2002/0006139 A1*  1/2002  Kikkawa et al.
2010/0067404 A1*  3/2010  Van Wageningen et al.
(Continued)

FOREIGN PATENT DOCUMENTS

JP    2011-004276 A    1/2011

*Primary Examiner* — Marsha D Banks Harold
*Assistant Examiner* — Dharmesh J Patel
(74) *Attorney, Agent, or Firm* — Hunton Andrews Kurth LLP

(57) ABSTRACT

An in-vehicle network system deployed in a vehicle includes a plurality of first nodes configured to perform an operation relevant to a first function in the vehicle, a second node configured to perform an operation relevant to a second function different from the first function in the vehicle; and a relay device configured to relay communication between the first nodes and the second node. The relay device is configured to start relay of communication between the first nodes earlier than the relay of communication between the first node and the second node at a time of startup.

4 Claims, 3 Drawing Sheets

(51) Int. Cl.
*H04L 29/08* (2006.01)
*H04L 12/40* (2006.01)
*H04L 12/931* (2013.01)

(52) U.S. Cl.
CPC .............. *H04L 49/35* (2013.01); *H04L 67/12* (2013.01); *H04L 2012/40215* (2013.01); *H04L 2012/40273* (2013.01)

(58) Field of Classification Search
CPC ..... H04L 2012/40215; H04L 2012/273; H04L 2209/48
See application file for complete search history.

(56) References Cited

U.S. PATENT DOCUMENTS

2011/0128855 A1* 6/2011 Ando et al.
2014/0297109 A1* 10/2014 Shimomura et al.

\* cited by examiner

IN-VEHICLE NETWORK SYSTEM, RELAY DEVICE, AND METHOD OF CONTROLLING IN-VEHICLE NETWORK SYSTEM

INCORPORATION BY REFERENCE

The disclosure of Japanese Patent Application No. 2016-250000 filed on Dec. 22, 2016 including the specification, drawings and abstract is incorporated herein by reference in its entirety.

BACKGROUND

1. Technical Field

The present disclosure relates to an in-vehicle network system, a relay device, and a method of controlling an in-vehicle network system.

2. Description of Related Art

In the related art, an in-vehicle network in which a plurality of nodes (ECUs) is communicatably connected via a relay device (a gateway device) is known (see, for example, Japanese Unexamined Patent Application Publication No. 2011-4276 (JP 2011-4276 A)).

SUMMARY

In the in-vehicle network based on an Ethernet (registered trademark) protocol, the relay device and each node are connected in one to one correspondence. Therefore, the relay device performs relay of communication even when networks to which two nodes that are communication targets belong are the same as or different from each other.

However, the relay device normally starts a relay process after startup is completed. Therefore, for example, at the time of startup of the relay device such as the time of ignition ON of the vehicle, the relay is unlikely to be started between the nodes in a group in a case where the startup of all relay functions is not completed even when a function of performing relay between the nodes in the group performing an operation relevant to the same function in the vehicle among a plurality of nodes has been started up. Then, execution of the function is likely to be affected by a delay of relay start of communication between the nodes in the group.

The present disclosure provides an in-vehicle network system, a relay device, and a method of controlling the in-vehicle network system capable of earlier starting relay of communication between nodes in a group performing an operation relevant to the same function among a plurality of nodes connected to the relay device at the time of startup of the relay device.

A first aspect of the present disclosure relates to an in-vehicle network system deployed in a vehicle including a plurality of first nodes configured to perform an operation relevant to a first function in the vehicle; a second node configured to perform an operation relevant to a second function different from the first function in the vehicle; and a relay device configured to relay communication between the first nodes and the second node. The relay device is configured to start relay of communication between the first nodes earlier than the relay of communication between the first node and the second node at a time of startup.

According to the first aspect of the present disclosure, at the startup of the relay device, relay of communication between the first nodes that performs an operation relevant to the first function is started earlier than the relay of the communication between the first node and the second node corresponding to different functions. Therefore, it is possible to earlier start communication between nodes (the first nodes) in a group realizing the same function (the first function) in the vehicle regardless of startup completion of another relay function (a relay function between the first node and the second node) or the like at the time of startup of the relay device.

In the in-vehicle network system according to the first aspect of the present disclosure, the first nodes may belong to a first network, and the second node may belong to a second network different from the first network. The relay device may include a first relay unit that is configured to perform relay of communication within the same network, and a second relay unit that is configured to perform relay of communication between the different networks. The first relay unit may be configured to start the relay of the communication within the same network before the relay of the communication between the different networks in the second relay unit is started at the time of startup of the relay device.

According to the first aspect of the present disclosure, the first relay unit first starts the relay within the same network even before the startup of the second relay unit performing the relay of the communication between the different networks is completed. Therefore, it is possible to earlier start communication between the nodes in a group (the first nodes) realizing the same function in the vehicle included in the same network.

In the in-vehicle network system according to the first aspect of the present disclosure, the first relay unit may be configured to perform the relay of the communication within the same network using hardware, and the second relay unit may be configured to perform the relay of the communication between the different networks using software.

According to the first aspect of the present disclosure, since the first relay unit is configured to perform the relay within the same network using the hardware, the first relay unit can specifically complete the startup of the relay function earlier than the second relay unit performing the relay between the different networks using the software.

In the in-vehicle network system according to the first aspect of the present disclosure, the second relay unit may be configured to perform the relay of the communication between the different networks using a function of performing the relay of the communication within the same network in the first relay unit, and the first relay unit may be configured to start the relay of the communication within the same network regardless of a startup situation of the second relay unit.

According to the first aspect of the present disclosure, since the second relay unit uses the relay function of the first relay unit, the completion of the startup is inevitably delayed as compared with the first relay unit. On the other hand, since the first relay unit starts the relay within the same network regardless of a startup situation of the second relay unit, the first relay unit can earlier start the communication between the nodes in the group (the first nodes) realizing the same function in the vehicle included in the same network in such a case.

In the in-vehicle network system according to the first aspect of the present disclosure, the first relay unit may be a switch circuit, and may be configured to relay the communication within the same network based on a routing table stored in a storage device.

In the in-vehicle network system according to the first aspect of the present disclosure, the second relay unit configured using the software may be a microcomputer including a central processing unit (CPU), and may be configured to relay the communication in the different network by executing an application program that is stored in a memory.

A second aspect of the present disclosure relates to a relay device to which a plurality of nodes belonging to any one of a plurality of networks is connected, and configured to relay communication between the nodes. The relay device includes a first relay unit configured to relay communication within the same network and a second relay unit configured to relay communication between different networks. The first relay unit is configured to start the relay of the communication within the same network before the relay of the communication between the different networks in the second relay unit is started at a time of startup of the relay device.

A third aspect of the present disclosure relates to a method of controlling an in-vehicle network system deployed in a vehicle including a plurality of first nodes belonging to a first network and configured to perform an operation relevant to a first function in the vehicle, a second node belonging to a second network different from the first network and configured to perform an operation relevant to a second function different from the first function in the vehicle, and a relay device including a first relay unit configured to relay communication between the first nodes and the second node to perform relay of communication within the same network, and a second relay unit configured to perform relay of communication between the different networks. The method includes starting, by the first relay unit, the relay of the communication within the same network; reading and starting up, by the second relay unit, an application for relaying the communication between the different networks; and starting, by the first relay unit and the second relay unit, the relay of the communication between the different networks when the second relay unit determines that a startup of the application has been completed.

According to the aspect of the present disclosure, it is possible to provide, for example, an in-vehicle network system capable of earlier starting relay of communication between nodes in a group that perform an operation relevant to the same functions among the nodes connected to the relay device at the time of startup of a relay device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings.

First, a configuration of an in-vehicle network system 1 according to the embodiment will be described with reference to FIG. 1.

Figure 1:
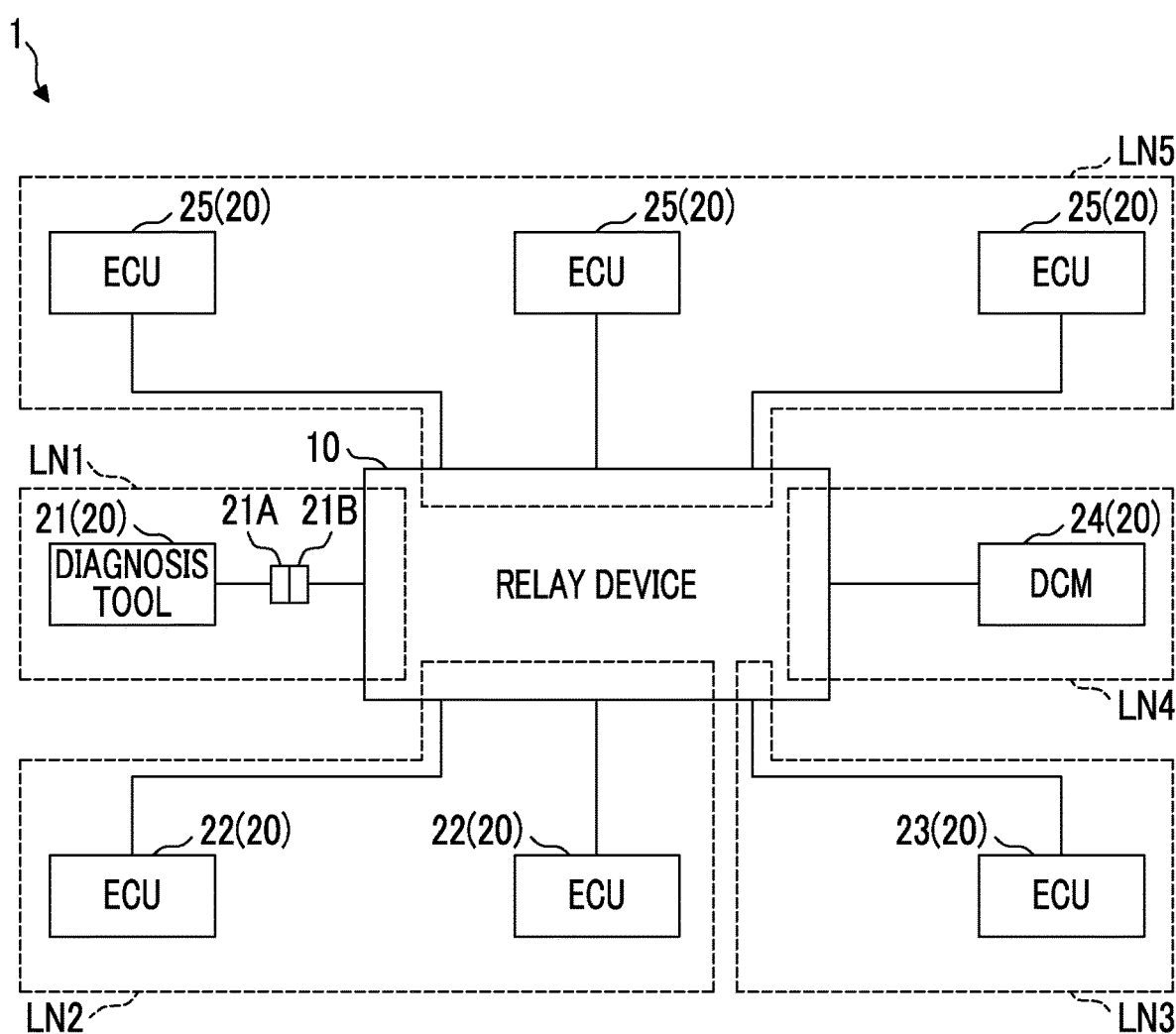
FIG. 1 is a block diagram illustrating an example of a configuration of an in-vehicle network system.

FIG. 1 is a block diagram schematically illustrating an example of a configuration of an in-vehicle network system 1. The in-vehicle network system 1 is mounted on an arbitrary vehicle, and includes a relay device 10 and a plurality (eight in the embodiment) of nodes 20 capable of communicating with each other based on an Ethernet (registered trademark) protocol via the relay device 10.

The relay device 10 relays communication between the nodes 20. As will be described below, the relay device 10 relays communication between the nodes 20 that are grouped in an aspect in which the nodes belong to any one of a plurality (five in the embodiment) of local networks LN1 to LN5. That is, the relay device 10 performs relay of communication between the nodes 20 in the same local network (the same domain), and performs relay of communication between two nodes 20 belonging to different local networks (communication between different local networks (different domains)). The relay device 10 is, for example, an L3 switch. A configuration of the relay device 10 will be described in detail below.

The nodes 20 include five types nodes 20 (a diagnosis tool 21, an electronic control unit (ECU) 22, an ECU 23, a DCM 24, and an ECU 25) that perform operations relevant to different functions in the vehicle. The diagnosis tool 21, the electronic control unit (ECU) 22, the ECU 23, the data communication module (DCM) 24, and the ECU 25 belong to the local networks LN1 to LN5, respectively.

Segmentation of the local networks LN1 to LN5 is realized by a virtual LAN (VLAN) function of the relay device 10 (L3 switch), for example. Further, the relay device 10 belongs to all the local networks LN1 to LN5.

The diagnosis tool 21 belongs to the local network LN1, as described above. The diagnosis tool 21 performs an operation regarding a function of connecting to any one of the nodes 20 communicatably from the outside (external connection function) according to an operation of a user. Specifically, the diagnosis tool 21 transmits, for example, a predetermined command (for example, a command to request diagnosis information) of which a destination is any one of the nodes 20 to the relay device 10. Thus, the command is relayed (transferred) to any one of the nodes 20 by the relay device 10 according to destination information included in the command. The diagnosis tool 21 is communicatably connected to the relay device 10 by connecting a predetermined connector 21A provided at a tip of a connection line (an Ethernet cable) extending from a main body and a data link coupler (DLC) connector 21B provided at a tip of a connection line connected to a port of the relay device 10. That is, normally, the diagnosis tool 21 (the connector 21A) is connected to, for example, the DLC connector 21B by a user (a mechanic in a dealer or the like) via the relay device 10 when it is needed to read diagnosis information from the other node 20 (for example, the ECU 23), instead of being connected to the DLC connector 21B.

There are two ECUs 22, which belong to the local network LN2, as described above. The ECU 22 is an electronic control unit that executes various processes relevant to a predetermined function. For example, the ECU 22 performs an operation relative to a function (infotainment function) of performing provision of information to the user in the vehicle (for example, provision of route guidance information, road traffic information, or the like) or provision of entertainment to the user (for example, reproduction of music, video, or the like). The two ECUs 22 have a configuration capable of realizing an infotainment function solely through communication between the ECUs 22, that is, communication within the local network LN2 regardless of communication with the outside.

The ECU 23 belongs to the local network LN3, as described above. The ECU 23 is an electronic control unit that executes various processes relevant to a predetermined function. For example, the ECU 23 performs an operation relevant to a control function (a body control function) for a body system (for example, air conditioning, lighting, power window, or the like).

The DCM 24 belongs to the local network LN4, as described above. The DCM 24 performs an operation regarding a function of performing transmission and reception of various types of data (an external communication function) between a device (for example, an information center that collects information from the vehicle or provides information to the vehicle) external to the vehicle and the nodes 20.

There are three ECUs 25, which belong to the local network LN5, as described above. The ECU 25 performs, for example, an operation relevant to a function of detecting an object around the vehicle using a camera mounted on the vehicle (an object detection function). Similar to the case of the ECUs 22, the three ECUs 25 have a configuration capable of realizing the object detection function solely through mutual communication, that is, communication within the local network LN5 regardless of communication with the outside.

Next, a specific configuration of the relay device 10 will be described with reference to FIG. 2.

Figure 2:
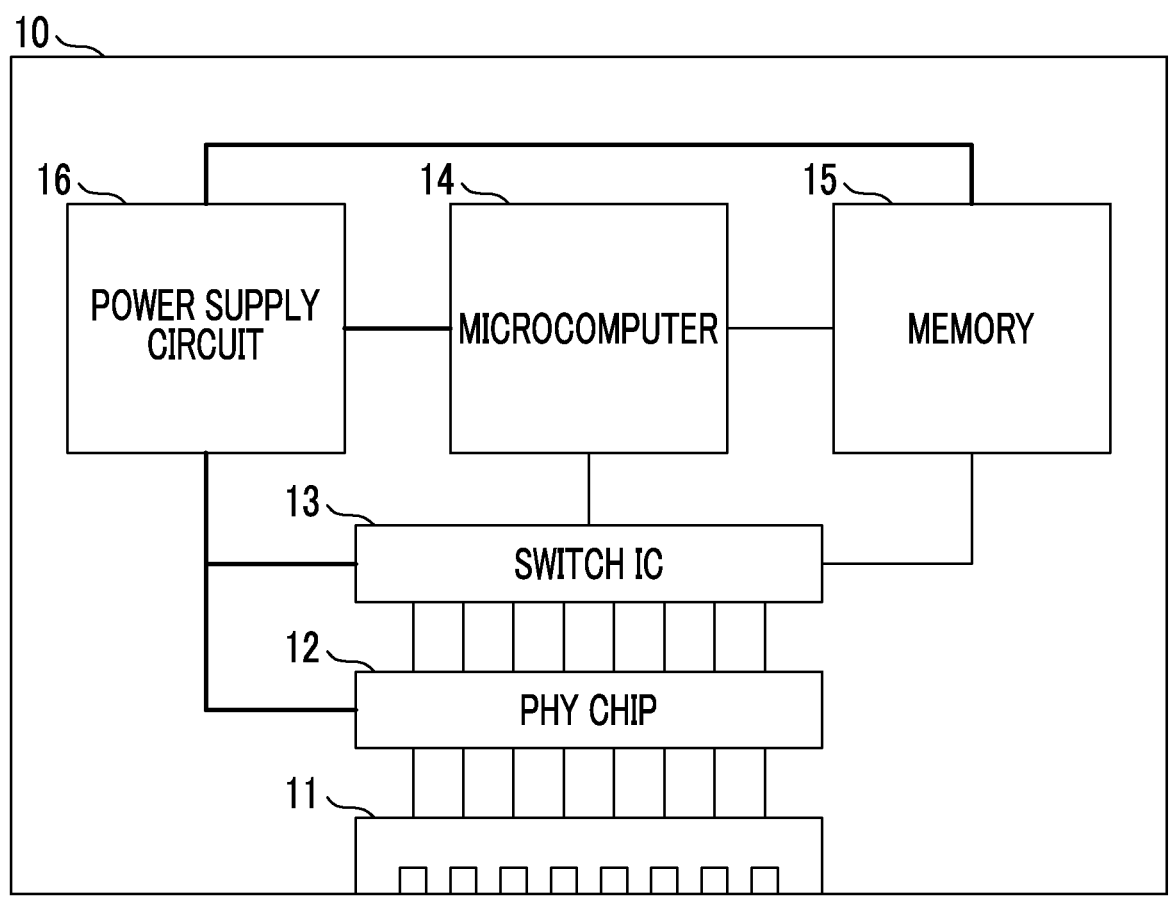
FIG. 2 is a diagram schematically illustrating an example of a configuration of a relay device.

FIG. 2 is a diagram schematically illustrating an example of a configuration of the relay device 10. The relay device 10 includes a connector 11, a physical layer (PHY) chip 12, a switch integrated circuit (IC) 13, a microcomputer 14, a memory 15, and a power supply circuit 16.

In FIG. 2, a thin solid line indicates a signal system, and a thick solid line indicates a power supply system.

The connector 11 has a plurality of ports (at least eight ports in the embodiment), and is configured such that a connection line (Ethernet cable) connected to any one of the nodes 20 can be connected to each port.

The PHY chip 12 is connected to each port of the connector 11 and executes, for example, a process of a physical layer in an OSI reference model of converting an electric signal from the node 20 input from each port into a logic signal or converting a logic signal output (transmitted) from each port to the node 20 into an electric signal.

The switch IC 13 (an example of a first relay unit) is hardware (integrated circuit) that realizes a function of performing relay of communication between the nodes 20 in the same local network (the same domain) based on a routing table (for example, an MAC address table) stored in the memory 15 (an intra-domain relay function). Meanwhile, when the switch IC 13 receives data corresponding to the communication between the two nodes 20 belonging to different local networks, the switch IC 13 outputs the data to the microcomputer 14. The switch IC 13 transmits the data from the port of the connector 11 corresponding to the node 20 that is a destination belonging to a local network different from a local network of a transmission destination according to a process of the microcomputer 14 (specifically, an inter-domain relay application to be described below).

The microcomputer 14 (an example of a second relay unit) includes a CPU and the like, and realizes various processes by executing various programs stored in the memory 15 on the CPU. For example, the microcomputer 14 realizes a relay function between different local networks (an inter-domain relay function) by executing a predetermined application program (an inter-domain relay application) stored in the memory 15 on the CPU. Specifically, the microcomputer 14 performs a process of replacing identification information indicating a transmission source of data that is received from the switch IC 13, such as VLAN ID, with an VLAN ID corresponding to a transmission destination, and performs return to the switch IC 13 based on the routing table (for example, an IP routing table or an ARP table) stored in the memory 15. Accordingly, the switch IC 13 determines that the data is data relevant to the communication in the local network to which the node 20 that is the transmission destination belongs, and transmits the data from the port of the connector 11 corresponding to the node 20 that is the transmission destination, relay of communication between different local networks is realized. That is, the microcomputer 14 realizes the inter-domain relay using the process according to the intra-domain relay function of the switch IC 13. Further, the microcomputer 14 performs, for example, a process of discarding data relevant to access limitation among pieces of data received from the switch IC 13 based on security setting information (for example, a setting regarding a transmission source has limited access to a specific local network) stored in the memory 15.

The memory 15 is a nonvolatile storage device. As described above, the routing table according to the relay in the same network, the application program for performing the relay of communication between the different local networks, the routing table according to the relay between the different local networks, the security setting information, and the like are stored in the memory 15. Further, an operating system (OS) program for operating the application program is stored in the memory 15.

The power supply circuit 16 generates electrical power of a voltage (for example, 3.3 V) suitable for the PHY chip 12, the switch IC 13, the microcomputer 14, and the memory 15 based on electrical power (about 12 V to 15 V) supplied from a power supply (for example, an auxiliary battery, an alternator, or the like) mounted on the vehicle, and supplies the electrical power to the PHY chip 12, the switch IC 13, the microcomputer 14, and the memory 15. The power supply circuit 16 is started up by the ignition-ON (IG-ON) of the vehicle, and starts electrical power supply to the PHY chip 12, the switch IC 13, the microcomputer 14, and the memory 15.

The IG-ON of the vehicle includes not only startup of an engine in an engine car, but also startup (power ON) of a main battery that supplies electrical power to an electric motor, which is a power source in an electrically powered vehicle such as an electric vehicle, a hybrid vehicle, or a range extender vehicle.

Next, a characteristic operation of the relay device 10, that is, an operation at the time of startup of the relay device 10 will be described with reference to FIG. 3.

Figure 3:
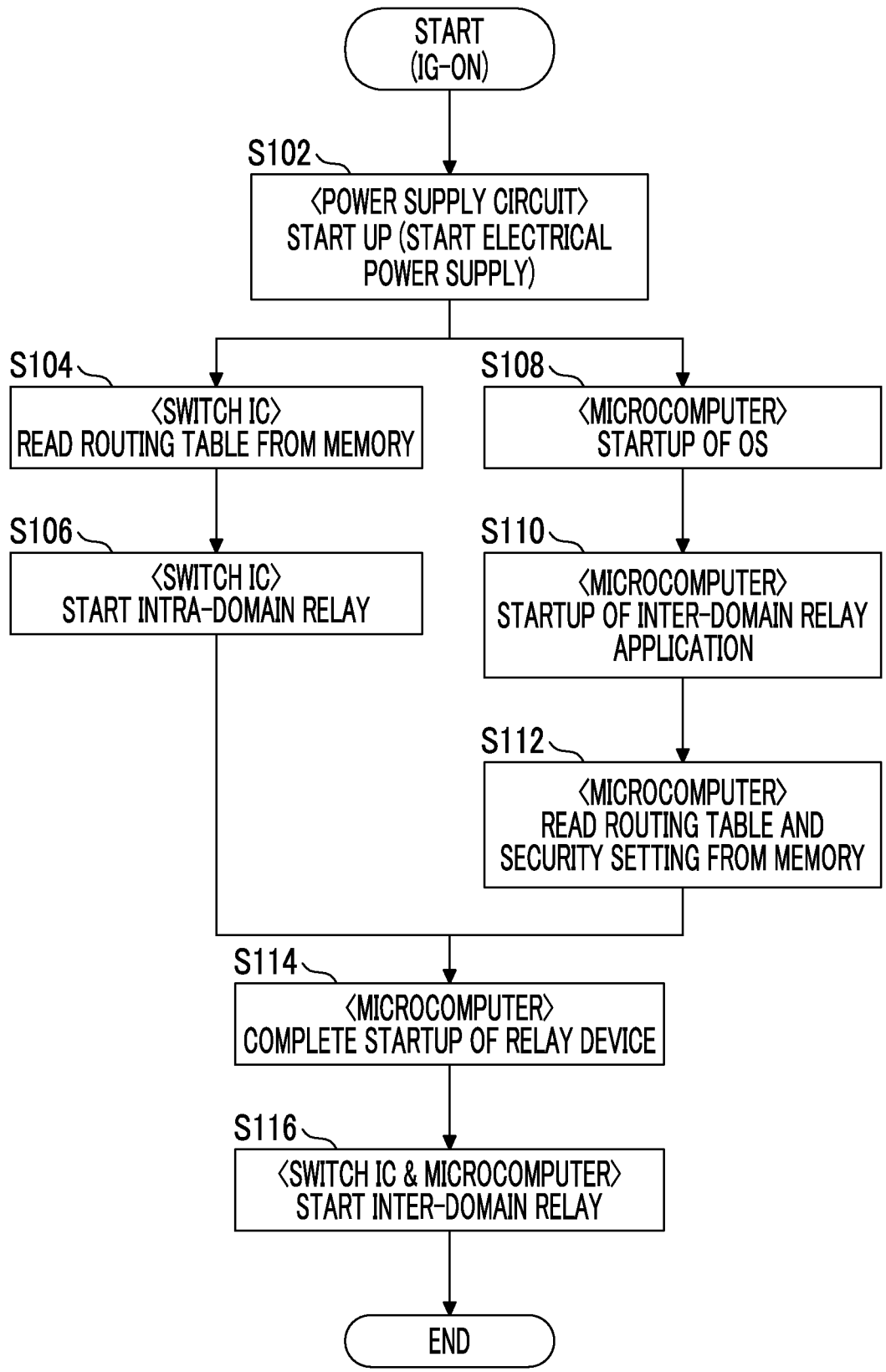
FIG. 3 is a flowchart schematically illustrating an example of process of the relay device.

FIG. 3 is a flowchart schematically illustrating an example of a process of the relay device 10. The process according to this flowchart is executed, for example, when the vehicle is IG-ON. Further, the process according to this flowchart may be executed when the relay device 10 is started up again due to some reasons (for example, abnormality in self-diagnosis).

In step S102, the power supply circuit 16 is started up when the vehicle is IG-ON as described above, and starts to supply the electrical power to the PHY chip 12, the switch IC 13, the microcomputer 14, and the memory 15. Thus, the process of starting up the intra-domain relay function in the switch IC 13 (steps S104 and S106) and the process of starting up the inter-domain relay function in the microcomputer 14 (steps S108 to S112) are started in parallel.

In step S104, the switch IC 13 reads the routing table from the memory 15.

In step S106, the switch IC 13 completes startup of the intra-domain relay function, and starts the process according to the intra-domain relay function. Accordingly, for example, since communication within the local network LN2 to which the ECU 22 performing an operation regarding an infotainment function belongs is started, the infotainment function is realized by the communication between the two ECUs 22. Further, for example, since the communication within the local network LN5 to which the ECU 25 performing an operation regarding the object detection function belongs is started, the object detection function is realized by the communication among the three ECUs 25.

Meanwhile, in step S108, the microcomputer 14 reads an OS program from the memory 15 and starts up an OS.

In step S110, the microcomputer 14 reads the inter-domain relay application from the memory 15, and starts up the inter-domain relay application in the OS.

In step S112, the microcomputer 14 reads the routing table from the memory 15, the security setting information, and the like.

After the processes of steps S104 and S106 in the switch IC 13 and the processes of steps S108 to S112 in the microcomputer 14, the microcomputer 14 determines that the startup of the relay device 10 is completed in step S114.

In step S116, the microcomputer 14 and the switch IC 13 start a process according to the inter-domain relay function. Accordingly, communication between the two nodes 20 belonging to different local networks is started.

Thus, in the embodiment, the in-vehicle network system 1 includes the first nodes (the ECU 22 or the ECU 25) that performs an operation relevant to a predetermined first function (the infotainment function and the object detection function) in the vehicle, the second node (the diagnosis tool 21, the ECU 23, the DCM 24, and the like) that performs an operation relevant to a second function (the external connection function, the body control function, the external communication function, and the like) different from the predetermined first function in the vehicle, and the relay device 10 that relays communication between the first nodes and the second node. At the time of startup, the relay device 10 starts the relay of the communication between the first nodes earlier than the relay of the communication between the first node and the second node. Specifically, it is assumed that the first nodes belong to the same network (the local network LN2 or the local network LN5), and the second node belongs to a network (the local network LN1, LN3, LN4) different from the first network, and the relay device 10 includes the first relay unit (the switch IC 13) that performs relay of the communication within the same network, and the second relay unit (microcomputer 14) that performs relay of communication between the different networks. At the time of startup of the relay device 10, the first relay unit starts the relay of the communication within the same network before the relay of the communication between the different networks in the second relay unit is started. Accordingly, the first relay unit first starts the relay within the same network even before the startup of the second relay unit performing the relay of the communication between the different networks is completed. Therefore, it is possible to earlier start communication between the nodes in a group (the first nodes) realizing the same function in the vehicle included in the same network.

Further, in the embodiment, the first relay unit (the switch IC 13) performs the relay of the communication within the same network using hardware, and the second relay unit (the microcomputer 14) performs the relay of the communication between the different networks using software. Accordingly, the first relay unit realizing the relay function within the network using the hardware can specifically complete the startup of the relay function earlier than the second relay unit performing the relay between the different networks using the software.

Further, in the embodiment, the second relay unit (the microcomputer 14) performs the relay of the communication between the different networks using the function of performing the relay of the communication within the same network in the first relay unit (the switch IC 13). In this case, since the second relay unit uses the relay function of the first relay unit, the completion of the startup is inevitably delayed as compared with the first relay unit. On the other hand, since the first relay unit starts the relay within the same network regardless of a startup situation of the second relay unit as described above, the first relay unit can earlier start the communication between the nodes in the group (the first nodes) realizing the same function in the vehicle included in the same network in such a case.

Although the function of performing the relay of the communication within the same network (the intra-domain relay function) is realized using the hardware (the switch IC 13) in the embodiment, the function may be realized using software, similar to the function of performing the relay of the communication within the different networks (inter-domain relay function). Further, although the inter-domain relay function is realized using the software in the embodiment, the function may be realized using the hardware, similar to the intra-domain relay function. Even in the above-described case, it is possible to achieve the same effects by starting the intra-domain relay function earlier than the inter-domain relay function, as described above.

Further, although the second relay unit realizes the inter-domain relay function using the intra-domain relay function in the first relay unit in the embodiment, the second relay unit may be configured to realize the inter-domain relay function without using the intra-domain relay function in the first relay unit. Even in this case, the same effects can be achieved by starting the intra-domain relay function earlier than the inter-domain relay function as described above.

Further, although the nodes 20 are directly connected to the relay device 10 via the connection line (Ethernet cable) in the embodiment, the nodes 20, for example, may be indirectly connected to the relay device 10 via another relay device performing solely the intra-domain relay, which is connected to the relay device 10 via a trunk link.

The embodiments of the present disclosure have been described in detail, but the present disclosure is not limited to the specific embodiments described above, and various modifications and changes can be made within the scope of the present disclosure defined in the claims.

What is claimed is:

1. An in-vehicle network system deployed in a vehicle comprising:
a plurality of first nodes configured to perform an operation relevant to a first function in the vehicle, the first nodes belonging to a first network;
a second node configured to perform an operation relevant to a second function different from the first function in the vehicle, the second node belonging to a second network different from the first network; and a relay device configured to relay communication between the first nodes and the second node, the relay device being configured to start relay of communication between the first nodes earlier than the relay of communication between the first node and the second node at a time of startup of the relay device, the relay device further comprises:

a switch circuit that is configured to perform relay of communication within the same network based on a routing table stored in a storage device, and a microcomputer, including a central processing unit, configured to relay the communication to the second different network by executing an application program that is stored in a memory, wherein, when the relay device starts up, the switch circuit starts to relay the communication within the same network based on the routing table stored in a storage device before the microcomputer starts to relay the communication to the second different network by executing the application program that is stored in the memory.

2. The in-vehicle network system according to claim 1, wherein the relay device includes a first relay unit and a second relay unit, the second relay unit is configured to perform the relay of the communication between the different networks using a function of performing the relay of the communication within the same network in the first relay unit, and the first relay unit is configured to start the relay of the communication within the same network regardless of a startup situation of the second relay unit.

3. A relay device to which a plurality of nodes belonging to any one of a plurality of networks is connected, and configured to relay communication between the nodes, the relay device comprising:

a first relay unit configured to relay communication within the same network; and a second relay unit configured to relay communication between different networks, a switch circuit that is configured to perform relay of communication within the same network based on a routing table stored in a storage device, and a microcomputer, including a central processing unit, configured to relay the communication between different networks by executing an application program that is stored in a memory, wherein, when the first relay unit starts up, the switch circuit starts to relay the communication within the same network based on the routing table stored in a storage device before the microcomputer starts to relay the communication between the different networks in the second relay unit by executing the application program that is stored in the memory.

4. A method of controlling an in-vehicle network system deployed in a vehicle including a plurality of first nodes belonging to a first network and configured to perform an operation relevant to a first function in the vehicle, a second node belonging to a second network different from the first network and configured to perform an operation relevant to a second function different from the first function in the vehicle, and a relay device including a first relay unit configured to relay communication between the first nodes and the second node to perform relay of communication within the same network with a switch circuit and based on a routing table stored in a storage device, and a second relay unit configured to perform relay of communication between the different networks by executing an application program that is stored in a memory of a microcomputer including a central processing unit for executing application programs, the method comprising:

starting, by the first relay unit, the relay of the communication within the same network at a time of startup of the relay device based on the routing table stored in the storage device;

reading and starting up, by the second relay unit, an application for relaying the communication between the different networks by executing the application program stored in the memory; and starting, by the first relay unit and the second relay unit, the relay of the communication between the different networks when the second relay unit determines that a startup of the application has been completed.

* * * * *

UNITED STATES PATENT AND TRADEMARK OFFICE
CERTIFICATE OF CORRECTION

PATENT NO. : 10,911,264 B2  
APPLICATION NO. : 15/845637  
DATED : February 2, 2021  
INVENTOR(S) : Shu Ishizuka et al.

Page 1 of 1

It is certified that error appears in the above-identified patent and that said Letters Patent is hereby corrected as shown below:

On the Title Page

In the Inventors section, please list the inventors in this order:
--Shu Ishizuka, Toyota (JP);
Hiroya Ando, Toyota (JP);
Taichi Matsumura, Toyota (JP);
Masashi Amesara, Toyota (JP);
Yutaka Ueda, Yokkaichi (JP);
Toshio Kawamura, Nagakute (JP);
Tomomi Kawamura, Nagakute (JP);
Yoshifumi Ohmori, Nagoya (JP);
Toshio Shimada, Nagoya (JP);
Yoshiro Hirata, Toyota (JP);--

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*